United States Patent
Van Wijk et al.

(10) Patent No.: US 9,829,091 B2
(45) Date of Patent: Nov. 28, 2017

(54) CONTINUOUSLY VARIABLE TRANSMISSION WITH A HYDRAULIC CONTROL SYSTEM

(71) Applicant: ROBERT BOSCH GMBH, Stuttgart (DE)

(72) Inventors: Wilhelmus Johannes Maria Van Wijk, Udenhout (NL); Lucas Hubertus Johannes Romers, Berg Aan de Maas (NL)

(73) Assignee: ROBERT BOSCH GMBH, Stuttgart (DE)

( * ) Notice: Subject to any disclaimer, the term of this patent is extended or adjusted under 35 U.S.C. 154(b) by 351 days.

(21) Appl. No.: 14/651,815

(22) PCT Filed: Dec. 18, 2013

(86) PCT No.: PCT/EP2013/077071
§ 371 (c)(1),
(2) Date: Jun. 12, 2015

(87) PCT Pub. No.: WO2014/095987
PCT Pub. Date: Jun. 26, 2014

(65) Prior Publication Data
US 2015/0316149 A1    Nov. 5, 2015

(30) Foreign Application Priority Data
Dec. 18, 2012 (EP) .................................... 12075138

(51) Int. Cl.
*F16H 61/00*       (2006.01)
*F16H 61/662*      (2006.01)
(Continued)

(52) U.S. Cl.
CPC ..... *F16H 61/0025* (2013.01); *F16H 57/0435* (2013.01); *F16H 57/0441* (2013.01);
(Continued)

(58) Field of Classification Search
CPC ............... F16D 25/123; F16H 57/0473; F16H 57/0489; F16H 61/66272; F16H 2061/661
(Continued)

(56) References Cited

U.S. PATENT DOCUMENTS 6,666,225 B2 * 12/2003 Kemmner ............... F16H 57/04
137/14
8,943,818 B2 * 2/2015 Ogata .................. F16H 61/0031
60/421

(Continued)

FOREIGN PATENT DOCUMENTS

EP     0367321 A1    5/1990
EP     0626526 A1    11/1994
(Continued)

OTHER PUBLICATIONS

International Search Report dated Apr. 10, 2015, in corresponding PCT application.

*Primary Examiner* — Thomas E Lazo
(74) *Attorney, Agent, or Firm* — Young & Thompson

(57) ABSTRACT

A continuously variable transmission is provided with a drive belt (6) drive belt (3), fitted between a primary pulley (1) and a secondary pulley (2) of the transmission, each pulley having two pulley sheaves (4, 5) of which at least one pulley sheave (4) in each case is axially movable under the influence of a hydraulic pressure exerted in a pressure cylinder (11; 12) of a respective pulley (1; 2), and with a hydraulic control system for controlling these respective cylinder pressures (Pp, Ps) including two oil pumps (41, 42). A pump flow control valve (100, 48) is provided and is arranged to connect to or disconnect from the main hydraulic line (46) the one oil pump (42) in dependency on a difference between an actual line pressure (Ps) in the main hydraulic line (46) and a desired pressure level there for.

9 Claims, 2 Drawing Sheets

Figure 1:
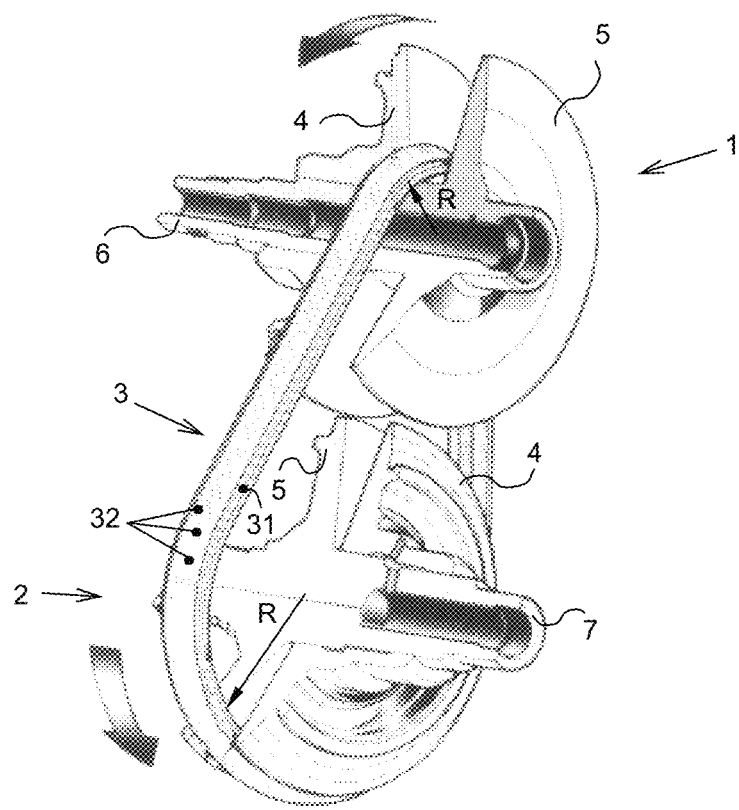

(51) Int. Cl.
*F16H 57/04* (2010.01)
*F16H 61/66* (2006.01)

(52) U.S. Cl.
CPC ... *F16H 57/0446* (2013.01); *F16H 61/66272* (2013.01); *F16H 2061/0037* (2013.01); *F16H 2061/6607* (2013.01)

(58) Field of Classification Search
USPC .......................................................... 60/484
See application file for complete search history.

(56) References Cited

U.S. PATENT DOCUMENTS

2002/0040603 A1  4/2002  Kemmner et al.
2012/0011841 A1  1/2012  Ogata et al.

FOREIGN PATENT DOCUMENTS

| EP | 2066929 | 6/2009 | |
|---|---|---|---|
| NL | WO 2009084952 A1 * | 7/2009 | ........... F16D 25/123 |
| WO | 2008/037665 A1 | 4/2008 | |
| WO | 2009/084952 A1 | 7/2009 | |

* cited by examiner

CONTINUOUSLY VARIABLE TRANSMISSION WITH A HYDRAULIC CONTROL SYSTEM

The present disclosure relates to a continuously variable transmission with a hydraulic control system for a drive line of a motor vehicle. Such a transmission is known from the European patent publication EP-A-2 066 929. The known transmission is provided with a drive belt and two pulleys, each provided with two conical pulley sheaves which are movable relative to each other in the axial direction, between which pulley sheaves a part of the drive belt is accommodated. During operation of the transmission the drive belt is clamped between the pulley sheaves of the two pulleys by forcing the sheaves of a pulley towards each other under the influence of a hydraulic pressure exerted upon at least one sheave. These hydraulic pulley pressures determine, on the one hand, the transmission ratio of the transmission and, on the other hand, the maximum torque that can be transmitted between the pulleys.

It is noted that the term drive belt, as used herein, is not limited to the specific type of drive belt of EP-A-2 066 929, but also encompasses other types of drive belt, such as the chain-type drive belt that is known—for instance—from another European patent publication EP-A-0 367 321.

In order to be able to accurately regulate the abovementioned pulley pressures to a level that is respectively desired there for, the transmission is provided with a hydraulic control system. In the cited example thereof, the known hydraulic control system comprises an oil reservoir, an oil pump for delivering an oil flow from the reservoir to a main hydraulic line of the hydraulic control system and a main system or line pressure valve for controlling the hydraulic pressure in such main line, i.e. the highest or main system pressure of the hydraulic control system, also denoted as the line pressure. Such a flow of pressurized oil delivered the oil pump is applied for realizing the pulley pressures, for effecting auxiliary functions of the transmission, such as the opening and/or closing of clutches, as well as for cooling and/or lubrication of moving parts of the transmission.

It is commonly known that during operation of the transmission the oil flow requirement of the transmission fluctuates strongly between a minimal flow for lubrication and cooling purposes only, to a maximal flow for a rapid change of the transmission ratio, such as occurs during an emergency stop of the motor vehicle, or in so called "step-mode" control of the transmission ratio, wherein such ratio is changed rapidly between a number of predetermined values to simulate a conventional, manually operated transmission that provides only a limited number of gear ratios.

Accordingly, it is a common development aim to optimize the known hydraulic control system in relation to such fluctuating oil flow requirement. For example EP-A-2 066 929 in this respect teaches to allow a surplus of the pump flow relative to the required oil flow to bypass the line pressure valve. Moreover, EP-A-2 066 929 teaches to provide the hydraulic control system with two pumps whereof one pump can be switched between being connected to the main line, delivering a flow of oil in parallel with the other pump, and being completely disconnected from the main line. In this known hydraulic control system, such switching occurs in dependency on a lubrication pressure. More in particular, EP-A-2 066 929 teaches to apply a pump flow control valve that switches the said one pump in the above-described manner in dependence on the level of the lubrication pressure, which is related to the pump flow, i.e. to the speed and oil flow of the pumps that, in turn, are determined by the speed of the vehicle engine.

Although very good (hydraulic) transmission efficiency can be obtained with such known hydraulic control system, it does suffer from the drawback that operating conditions can occur, wherein the line pressure drops below a desired level therefor. Such disadvantageous phenomenon in particular occurs when the said one pump is completely disconnected from the main line, at the time of a large increase in the oil flow demand of the transmission. For example the engagement of TC lockup clutch requires a large oil flow; however, the above-mentioned transmission ratio change, i.e. a rapid up- or downshift of the transmission, will be the most frequently occurring cause of increased oil flow demand. From the instance that such rapid up- or downshift commences, it takes some time before the lubrication pressure decreases enough to effect that the pump flow control valve (re-)connects the said one pump to the main line, i.e. in parallel with the other pump. During this time it can occur that the line pressure drops below the said desired level there for, because the flow of oil delivered by the other pump is smaller than the oil flow demand of the transmission. In this circumstance the line pressure valve simply cannot control the line pressure to the said desired level there for, not even when it completely closes.

It is a general desire in the art to improve the control behavior of the known transmission; more specifically it is a desire to avoid the above-mentioned disadvantageous phenomenon from occurring. The novel continuously variable transmission according to claim 1 hereinafter is designed to provide such improvement.

In the transmission according to the claim 1, the pump flow control valve(s) of the hydraulic control system, which valve(s) selectively connect(s) the said one pump to the main line or to the reservoir, thus allowing the oil flow delivered by that one pump to bypass the main line, is operated in dependency both on the lubrication pressure and on a difference between the pressure level actually prevailing in the main line and the said desired level there for. This latter, additional feature has the effect that the said one pump is effectively (re-)connected to the main line in response to either an increase of the desired line pressure or a decrease of the actual line pressure. This feature has the advantageous effect that the said one pump is disconnected from the reservoir by the pump flow control valve(s), providing a flow of oil to the main line, even before the lubrication pressure decreases. A rapid increase of the line pressure and/or an increase in the oil flow demand of the transmission can thus be optimally accommodated by this latter hydraulic control system.

One way to implement the above operation of the pump flow control valve(s) is by way of a solenoid that directly acts on a respective valve and that is electronically operated in dependency on the measured or otherwise established level of the lubrication pressure, the (actual) line pressure and the desired line pressure. However, in practice, the said respective valve will be mostly hydraulically operated, in which case it is provided with an effectively cylindrical valve spool that is arranged axially moveable inside a valve housing, whereof an axial position relative to the valve housing is determined by the balance between a force exerted by a spring fitted between a first axial end face thereof and the valve housing and a force exerted by the lubrication pressure acting on (a part of) the oppositely oriented, second axial end face thereof. In this arrangement of the pump flow control valve, the valve spool moves under the influence of the spring force to (gradually) close a hydraulic connection between a delivery port of the said one pump and the reservoir as the lubrication pressure becomes lower, and vice versa.

To implement the operation of the pump flow control valve(s) according to the claim 1, the above-mentioned balance of forces further includes a force exerted by the line pressure acting on (a part of) the said second end face and a force exerted by a line pressure valve pilot pressure acting on (a part of) the said first end face. This latter pilot pressure is otherwise applied to operate the line pressure valve and is, as such, proportional to or at least representative of the desired line pressure.

Of course, the surface areas of (the parts of) the said end faces of the valve spool, on which end faces the line pressure and the line pressure valve pilot pressure respectively act, are chosen such that the forces exerted thereon by these respective pressures cancel each other out when the (actual) line pressure coincides with the desired line pressure.

By the increase in the line pressure valve pilot pressure and/or decrease of the actual line pressure relative to the desired line pressure, which pressure fluctuations can, for example, accompany a rapid up- or downshift of the transmission ratio, it is realized in an advantageously simple and reliable manner that the said one pump is disconnected from the reservoir by the pump flow control valve and thereby is (re-)connected to the main line, irrespective of the lubrication pressure level.

Figure 4:
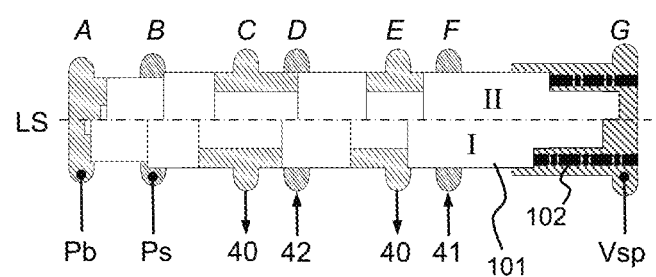
Figure 2:
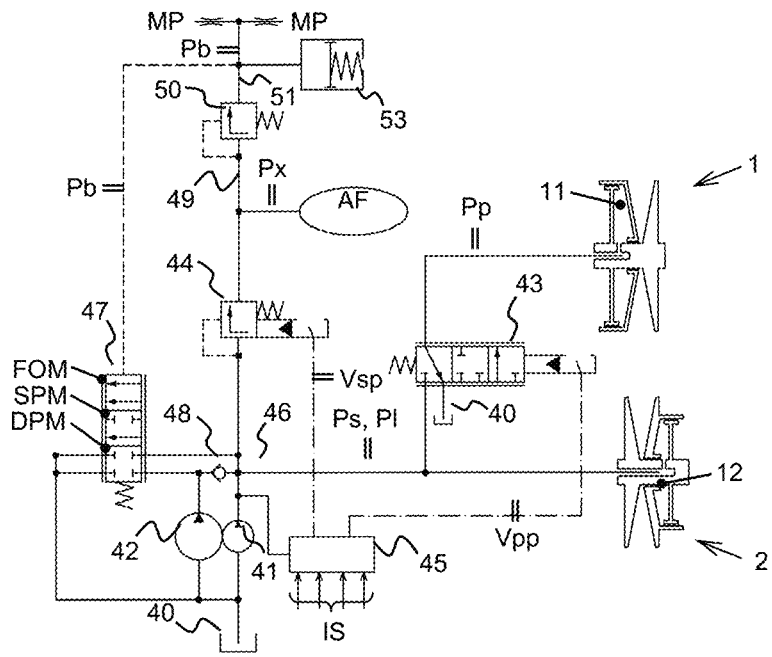
Figure 3:
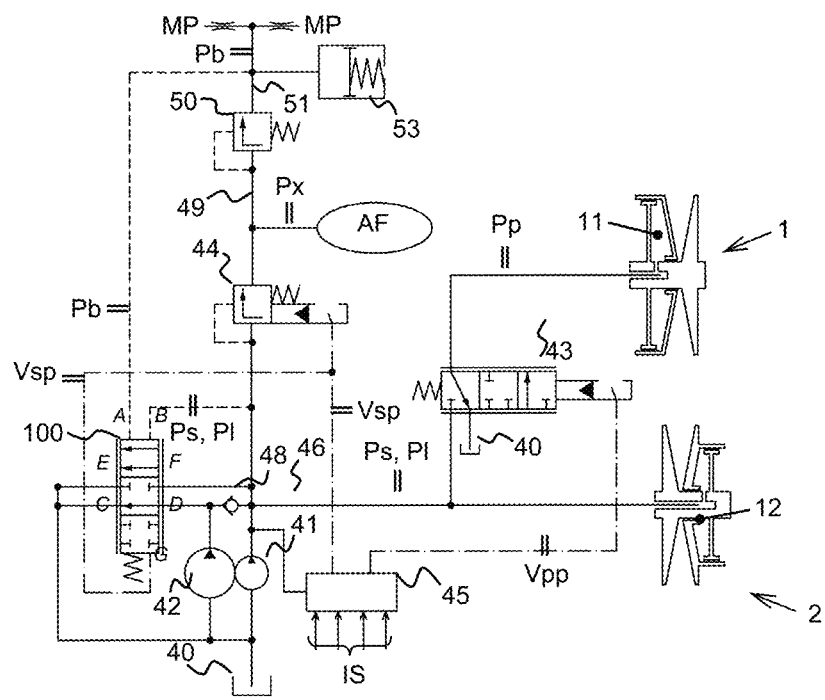

The invention will now be explained in greater detail by way of example with reference to the drawing, in which:

FIG. 1 is a schematic view of a part of a known continuously variable transmission with a drive belt and two pulleys;

FIG. 2 diagrammatically shows a hydraulic control system of the transmission of FIG. 1;

FIG. 3 diagrammatically shows an exemplary embodiment of a hydraulic control system in accordance with the invention; and FIG. 4 provides a schematic view of an exemplary embodiment of a pump flow control valve suitable for the hydraulic control system of FIG. 3.

FIG. 1 illustrates the central parts of a continuously variable transmission, such as is used in the drive line of a motor vehicle, for example a passenger car. The transmission is generally known per se and is provided with a primary pulley 1 and a secondary pulley 2, each pulley comprising two pulley sheaves 4, 5, and with a drive belt 3 wrapped around the pulleys 1, 2 and accommodated, in part, between the pulley sheaves 4, 5 thereof. The pulley sheaves 4, 5 define conically-shaped running surfaces for the drive belt 3 and at least one sheave 4 of each pulley 1, 2 is movable axially over a respective shaft 6, 7 on which the sheaves 4, 5 of a respective pulley 1, 2 are fitted.

In the shown example, the drive belt 3 comprises a pair of endless carriers 31, each composed of a set of nested, thin metal bands, which carry a series of metal transverse elements 32 that are fitted around the circumference of the endless carries 31 and that absorb forces exerted thereon by the pulley sheaves 4, 5. During operation of the transmission, the transverse elements 32 of the drive belt 3 are set in motion by a rotation of a driving pulley 1, 2 and push each other along the endless carrier elements 31 to the other pulley 1, 2 that is rotationally driven thereby. Such a drive belt 3 is described in further detail in, for example, European patent EP-0626526-A1.

The transmission furthermore comprises a hydraulic control system, in particular an electro-hydraulic control system, that imposes a respective hydraulic pressure on each one of the said moveable sheaves 4 of the pulleys 1, 2. As a result, the drive belt 3 is clamped between the pulley sheaves 4, 5 of the two pulleys 1, 2 and mechanical power can be transmitted there between by means of friction. Hereby the absolute level of such pulley pressures determines the torque that can be transmitted between the pulleys 1, 2 and the ratio between such pulley pressures controls the respective radial positions R of the drive belt between the sheaves 4, 5 of the pulleys 1, 2, i.e. controls the transmission ratio.

A commonly known example of such a hydraulic control system is diagrammatically illustrated in FIG. 2. The hydraulic control system of FIG. 2 is arranged to control a secondary (hydraulic) pressure Ps in a pressure cylinder 12 of the secondary pulley 2 and a primary (hydraulic) pressure Pp in a pressure cylinder 11 of the primary pulley 1.

In the shown example of the hydraulic control system, the secondary pressure Ps is the highest pressure in the system, i.e. the so-called line pressure, which line pressure (also) prevails at the delivery port of at least one of the two pumps 41, 42 and in a main hydraulic line 46 of the hydraulic control system. It is noted that in well-known alternative arrangements of the hydraulic control system, the pressures in the pressure cylinders 11, 12, although still derived from the line pressure, are controlled separately by the presence of at least one additional valve.

To be able to generate the said primary and secondary pressures Pp, Ps, the known hydraulic control system is provided with a reservoir 40 for hydraulic fluid, i.e. oil, with two oil pumps 41, 42 for generating an oil flow from the reservoir 40 to other parts of the hydraulic control system, with a primary valve 43 for regulating the primary pressure Pp and a secondary or line pressure valve 44 for regulating the secondary pressure Ps.

Both the primary valve 43 and the line pressure valve 44 are controlled electro-hydraulically by means of a valve control unit 45 that uses input signals IS, control logic (i.e. software) and solenoids to generate a primary valve pilot pressure Vpp that controls the primary valve 43 and a secondary valve pilot pressure Vsp that controls the line pressure valve 44. As can be deduced from FIG. 2, the line pressure valve 44 is set-up as a pressure control valve; meaning that the line pressure Ps that is set thereby is proportional to the secondary valve pilot pressure Vsp. The primary valve 43 is set-up as a flow control valve 43 that does not provide a direct dependency between the primary pressure Pp and the primary valve pilot pressure Vpp. Instead, the level of the primary valve pilot pressure Vpp determines whether the primary pressure Pp is reduced (by the primary valve 43 connecting the pressure cylinder 11 of the primary pulley 1 to the reservoir 40), is kept constant, or is increased (towards the level of the secondary pressure Ps by the primary valve 43 connecting the pressure cylinder 11 of the primary pulley 1 to the main line 46).

The line pressure valve 44 allows (excess) oil to discharge from the main line 46 into an auxiliary hydraulic line 49 of the hydraulic control system, wherefrom a number of auxiliary functions AF of the transmission, such as the opening and/or closing of a clutch, are fed with pressurized oil. An auxiliary valve 50 is provided to control an auxiliary pressure Px in the auxiliary line 49. This auxiliary valve 50 allows (excess) oil to discharge from the auxiliary line 49 into a lubrication circuit 51 of the hydraulic control system, wherefrom moving parts MP of the transmission, such as the drive belt 3, bearings etc., are fed with oil. A lubrication pressure Pb prevailing in the lubrication circuit 51 is a/o determined by the amount or flow of oil passing the auxiliary valve 50. A pressure limiting valve (not shown) may be incorporated in the lubrication circuit 51 to prevent over-pressurization.

Both the oil pumps 41, 42 can deliver oil to the main line 46 of the hydraulic control system during operation of the transmission. However, one pump 42 can also be disconnected from the main line 46 by means of a pump flow control valve 47 and a check-valve 48 of the hydraulic control system working in cooperation. The pump flow control valve 47 is controlled by and in dependency on the lubrication pressure Pb. More in particular, the pump flow control valve 47 and the check-valve 48 are arranged to switch the said one pump 42 between being connected to the main line 46 when the lubrication pressure Pb is low, i.e. in a dual pump mode or "DPM" thereof, and being disconnected from the main line 46 when the lubrication pressure Pb is high, i.e. single pump mode or "SPM". In this latter single pump mode SPM, the pump flow control valve 47 has opened a direct hydraulic connection between the said one pump 42 and the reservoir 40 and the check-valve 48 has closed automatically to prevent that oil flows from the main line 46 to the said one pump 42 and/or into the reservoir 40. Thus, effectively, the said one pump 42 is "short-circuited", by the pump flow control valve 47.

In its embodiment illustrated in FIG. 2, the pump flow control valve 47 is designed and arranged to gradually direct an increasingly larger part of the oil flow delivered by the said one pump 42 from the main line 46 towards the reservoir 40 in dependence on an increasing lubrication pressure Pb. Still, provided that the lubrication pressure Pb is high enough, the said one pump 42 will be completely disconnected from the main line 46 by the pump flow control valve 47. As the lubrication pressure Pb increases further still, the pump flow control valve 47 furthermore gradually directs an increasingly larger part of the oil flow delivered by the said other pump 41 from the main line 46 towards the reservoir 40, as this valve 47 gradually shifts from the said single pump mode SPM to a fully open mode or "FOM" thereof.

This known hydraulic control system suffers from the drawback that, if a flow of oil from the main line 46 to the pressure cylinders 11, 12 of the pulleys 1, 2 increases rapidly, the secondary pressure Ps can dip below a desired or even a required level there for. This phenomenon is caused by the circumstance that the lubrication pressure Pb does not respond immediately to a change in the oil flow demand of the hydraulic control system, such that the corresponding control of the oil flow control of the pump flow control valve 47, i.e. either towards the main line 46 or the reservoir 40, lags behind such change. In fact, the presence of a hydraulic accumulator 53—that is applied in the known hydraulic control system to reduce fluctuations in/of the lubrication pressure Pb and to increase the stability of the hydraulic control system as a whole-disadvantageously delays the response of the pump flow control valve 47 to a change in the oil flow demand of the hydraulic control system even more.

The present invention aims to overcome the above explained drawback of the known hydraulic control system.

The present invention is illustrated in FIG. 3. FIG. 3 depicts a novel hydraulic control system that largely corresponds to the known hydraulic control system of FIG. 2, however, that is augmented with the technical features that implement the invention by way of example.

In FIG. 3 the hydraulic control system is provided with a modified pump flow control valve 100 that is controlled not only in dependency on the lubrication pressure Pb, but also in dependency on a difference between the secondary pressure Ps and the secondary valve pilot pressure Vsp. To this end, the modified pump flow control valve 100 is provided that is arranged such that the secondary pressure Ps acts in parallel with the lubrication pressure Pb, whereas the secondary valve pilot pressure Vsp acts oppositely. As a result, a sufficiently large increase of the secondary valve pilot pressure Vsp, which increase is representative of a desired increase of the secondary pressure Ps, causes the pump flow control valve 100 and the check-valve 48 to (re-) connect the said one pump 42 to the main line 46. Hereby, the pump flows of both pumps 41, 42 are available for raising the secondary pressure Ps favorably quickly, i.e. even before the lubrication pressure Pb decreases. A similarly favorable behavior of the hydraulic control system occurs for example when the secondary pressure Ps decreases relative to the secondary valve pilot pressure Vsp, in particular when the primary valve opens 43 to fill the primary cylinder 11.

Further, if the (actual) secondary pressure Ps corresponds to its desired value, i.e. to the pressure value prescribed by the secondary valve pilot pressure Vsp, the respective influences thereof on the flow control valve 100 cancel each other out, such that the flow control valve 100 is effectively controlled in dependency on (only) the lubrication pressure Pb.

It is noted that, most preferably, the highest controlled or pressure level in the hydraulic control system and the valve pilot pressure that is associated therewith are applied to act on the pump flow control valve 100 in the manner described hereinabove. In the hydraulic control system of FIG. 3, these are indeed the secondary pressure Ps and the secondary valve pilot pressure Vsp; however, generally speaking these will be the line pressure and line pressure valve pilot pressure of the hydraulic control system respectively.

In the hydraulic control system of FIG. 3, a hydraulic accumulator 53 may favorably be incorporated in the lubrication circuit 51 without detriment to the said response of the pump flow control valve 100.

In FIG. 4 the pump flow control valve 100 of FIG. 3 is shown in more detail. The pump flow control valve 100 is provided with a valve spool 101 arranged axially moveable inside a valve housing (not shown). The valve housing defines several hydraulic ports A-G (see also FIG. 3), whereof valve control ports A, B and G are respectively pressurized at/by the lubrication pressure Pb, the secondary pressure Ps and the secondary valve pilot pressure Vsp, and whereof valve functional ports C, D, E and F are respectively connected to the reservoir 40, to the (delivery port of the) said one pump 42, to the reservoir 40 again and to the (delivery port of the) other pump 41.

By its shape and its axial position relative to the valve functional ports C-F, the valve spool 101 provides certain hydraulic connections there between. For example in an axial position I, depicted below the line of symmetry LS in FIG. 4, both pumps 41, 42 are disconnected from the reservoir 40, i.e. the pump flow control valve 100 provides no hydraulic connection there between, such that both pumps 41, 42 deliver a flow of oil to the main line 46 of the hydraulic circuit, working in parallel ("DPM"). In an axial position II depicted above the line of symmetry LS in FIG. 4, in which latter position II the valve spool is shifted to the right relative to the former position I thereof, the (delivery port of the) said one pump 42 is connected to the reservoir 40 via the valve functional ports D and C. As a result of such hydraulic connection, the pressure (at the delivery port) of the said one pump 42 drops below the secondary pressure Ps and the check-valve 48 closes, disconnecting the (delivery port of) of the said one pump 42 from the main line 46 and thus reducing the power required for the operation of this one oil pump 42 ("SPM").

The axial position of the valve spool 101 of the pump flow control valve 100 is determined by a number of forces that act in the axial direction thereon. These forces include:
- a force exerted by a spring 102 that is fitted between the valve spool 101 and the valve housing and that urges the valve spool towards the left in FIG. 4,
- a force exerted by the lubrication pressure Pb that urges the valve spool towards the right in FIG. 4,
- a force exerted by the secondary pressure Ps that urges the valve spool towards the right in FIG. 4, and
- a force exerted by the secondary valve pilot pressure Vsp Ps that urges the valve spool towards the left in FIG. 4.

Thus the forces exerted by the spring 102 and the secondary valve pilot pressure Vsp cooperate to urge the valve spool 101 towards the left in FIG. 4 and thereby to disconnect the said one pump 42 from the reservoir 40 and to effectively connect the said one pump 42 to the main line 46 via the check-valve 48. On the other hand, the forces exerted by lubrication pressure Pb and the secondary pressure Ps cooperate to urge the valve spool 101 towards the right in FIG. 4 and thereby to (gradually) connect the said one pump 42 to the reservoir 40 and to effectively disconnect the said one pump 42 from the main line 46 by the closing of the check-valve 48.

The surface areas of the valve spool 101, whereon the secondary pressure Ps and the line pressure valve pilot pressure Vsp respectively act, are chosen such that, when the (actual) line pressure Ps coincides with the desired line pressure Vsp, the said forces exerted by these respective pressure levels Ps and Vsp cancel each other out. In this latter circumstance, these latter pressure levels Ps and Vsp have no influence on the axial position of the valve spool 101, such that this position and thus the (combined) pump flow to the main line 46 is effectively controlled in dependency on the lubrication pressure Pb alone. However, when the line pressure valve pilot pressure Vsp increases or the secondary pressure Ps decreases, e.g. due to an up- or downshift of the transmission ratio, the (delivery port of the) said one pump 42 is disconnected from the reservoir 40 by the pump flow control valve 100 and is thus reconnected to the main line 46, irrespective of the lubrication pressure Pb.

It is noted that the pump flow control valve 100 and/or the check-valve 48 need not necessarily be implemented as a separate valves 100, 48, but may also be integrated in another valve of the hydraulic control system. In particular the check-valve 48 may very well be integrated with the pump flow control valve 100.

The present disclosure, in addition to the entirety of the preceding description and all details of the accompanying figures, also concerns and includes all the features of the appended set of claims. Bracketed references in the claims do not limit the scope thereof, but are merely provided as non-binding examples of the respective features. The claimed features can be applied separately in a given product or a given process, as the case may be, but it is also possible to apply any combination of two or more of such features therein.

The invention(s) represented by the present disclosure is (are) not limited to the embodiments and/or the examples that are explicitly mentioned herein, but also encompasses amendments, modifications and practical applications thereof, in particular those that lie within reach of the person skilled in the relevant art.

The invention claimed is:

1. Continuously variable transmission provided with a drive belt (3), fitted between a primary pulley (1) and a secondary pulley (2) of the transmission, each pulley having two pulley sheaves (4, 5) of which at least one pulley sheave (4) of each pulley (1, 2) is axially movable under the influence of a hydraulic pressure exerted in a pressure cylinder (11; 12) of the respective pulley (1; 2), and with a hydraulic control system for controlling these respective cylinder pressures (Pp, Ps), which hydraulic control system a/o comprises:
   - two oil pumps (41, 42) capable of delivering a flow of oil to a main hydraulic line (46) of the hydraulic control system,
   - a line pressure valve (44) capable of controlling a main system or line pressure (Ps) in the main hydraulic line (46) to coincide with a desired pressure level there for, by allowing a smaller or larger further flow of oil to discharge from the main hydraulic line (46) towards a lubrication circuit (51) of the hydraulic control system, and
   - one or more pump flow control valves (100, 48) capable of selectively connecting to or disconnecting from the main hydraulic line (46) at least one oil pump (42) of the said two oil pumps (41, 42) in dependency on a lubrication pressure (Pb) prevailing in the lubrication circuit (51), wherein, the one or more pump flow control valves (100, 48) is/are arranged to connect to or disconnect from the main hydraulic line (46) of the said one oil pump (42) in dependency on a difference between the line pressure (Ps) and the desired line pressure level.

2. The continuously variable transmission according to claim 1, wherein the one or more pump flow control valves (100, 48) is/are arranged to connect the said one oil pump (42) to the main hydraulic line (46) when the line pressure (Ps) is lower than the said desired line pressure level.

3. The continuously variable transmission according to claim 2, the line pressure valve (44) is operated by means of a line pressure valve pilot pressure (Vsp) representative of the said desired line pressure level and the one or more pump flow control valves (100, 48) is/are operated by means of the lubrication pressure (Pb), the line pressure (Ps) and the line pressure valve pilot pressure (Vsp).

4. The continuously variable transmission according to claim 3, wherein the one or more pump flow control valves (100, 48) includes/include a valve body (101) that is moveable relative to a valve housing with hydraulic ports (C, D) under the influence of forces that are exerted on the valve body (101) respectively by the lubrication pressure (Pb), the line pressure (Ps) and the line pressure valve pilot pressure (Vsp) and preferably also by a spring (102).

5. The continuously variable transmission according to claim 4, wherein the one or more pump flow control valves (100, 48), in particular a valve body (101) thereof, is/are designed such that when the line pressure (Ps) corresponds with the said desired line pressure level that is represented by line pressure valve pilot pressure (Vsp), the forces exerted on the valve body (101) by these respective pressures (Ps, Vsp) mutually correspond as well.

6. The continuously variable transmission according to claim 1, wherein the line pressure valve (44) is operated by means of a line pressure valve pilot pressure (Vsp) representative of the said desired line pressure level and the one or more pump flow control valves (100, 48) is/are operated by means of the lubrication pressure (Pb), the line pressure (Ps) and the line pressure valve pilot pressure (Vsp).

7. The continuously variable transmission according to claim 3, wherein the one or more pump flow control valves (100, 48) includes/include a valve body (101) that is moveable relative to a valve housing with hydraulic ports (C, D) under the influence of forces that are exerted on the valve body (101) respectively by the lubrication pressure (Pb), the line pressure (Ps) and the line pressure valve pilot pressure (Vsp) and preferably also by a spring (102).

8. The continuously variable transmission according to claim 7, wherein the one or more pump flow control valves (100, 48), in particular a valve body (101) thereof, is/are designed such that when the line pressure (Ps) corresponds with the said desired line pressure level that is represented by line pressure valve pilot pressure (Vsp), the forces exerted on the valve body (101) by these respective pressures (Ps, Vsp) mutually correspond as well.

9. The continuously variable transmission according to claim 1, wherein a hydraulic accumulator (53) is applied in the lubrication circuit (51) of the hydraulic control system.

\* \* \* \* \*